(12) United States Patent
Sim

(10) Patent No.: US 12,032,221 B2
(45) Date of Patent: Jul. 9, 2024

(54) FOLLOW FOCUS APPARATUS

(71) Applicant: Sarorn R. Sim, Detroit, MI (US)

(72) Inventor: Sarorn R. Sim, Detroit, MI (US)

( * ) Notice: Subject to any disclaimer, the term of this patent is extended or adjusted under 35 U.S.C. 154(b) by 304 days.

(21) Appl. No.: 17/389,609

(22) Filed: Jul. 30, 2021

(65) Prior Publication Data

US 2022/0035120 A1    Feb. 3, 2022

Related U.S. Application Data

(60) Provisional application No. 63/058,565, filed on Jul. 30, 2020.

(51) Int. Cl.
*G02B 7/02* (2021.01)
*G02B 7/04* (2021.01)
*G03B 3/10* (2021.01)

(52) U.S. Cl.
CPC .............. *G02B 7/04* (2013.01); *G02B 7/026* (2013.01); *G03B 3/10* (2013.01)

(58) Field of Classification Search
CPC ............. G02B 7/04; G02B 7/026; G03B 3/10
USPC ................................ 359/676–706, 822–826
See application file for complete search history.

(56) References Cited

U.S. PATENT DOCUMENTS

| 7,025,704 | B2* | 4/2006 | Yasuda | F16H 57/0427 475/210 |
| 10,345,682 | B1* | 7/2019 | Jamison, Jr. | G03B 11/045 |
| 2015/0286028 | A1* | 10/2015 | McCurry | G03B 3/00 359/825 |
| 2021/0033185 | A1* | 2/2021 | Aguinaldo | G02B 7/04 |

FOREIGN PATENT DOCUMENTS

WO   WO-2012136068 A1 * 10/2012 ............. G02B 7/026
WO   WO-2018094507 A1 * 5/2018

* cited by examiner

*Primary Examiner* — Mahidere S Sahle
(74) *Attorney, Agent, or Firm* — Carter, DeLuca & Farrell, LLP

(57) ABSTRACT

A follow focus apparatus for adjusting the focus of a camera lens includes a gear ring and a sizing ring. The gear ring includes an outer surface, an inner surface, and at least one through-hole extending radially therethrough. The outer surface has a plurality of teeth extending radially outwardly therefrom, and the inner surface has a cavity defined therein. The sizing ring is releasably coupled to the gear ring and includes an outer ring body coaxially coupled to an inner ring body.

20 Claims, 4 Drawing Sheets

FOLLOW FOCUS APPARATUS

CROSS-REFERENCE TO RELATED APPLICATIONS

This application claims the benefit of and priority to U.S. Provisional Patent Application No. 63/058,565, filed Jul. 30, 2020, the entire content of which is incorporated herein by reference.

FIELD

This disclosure generally relates to follow focus apparatus or gears that may be operatively coupled to a lens of a camera for more accurate and efficient focusing of the lens.

BACKGROUND

A follow focus apparatus (e.g., a follow focus gear) is a focus control mechanism that is used in photography and/or film making where changes in focus need to be made quickly and smoothly. The follow focus apparatus is not an actual part of a camera lens or used to capture images, but rather is used to efficiently and precisely move and focus the lens. The follow focus apparatus may be coupled directly to the front of a camera lens so as to surround the lens or may be mounted alongside the camera lens and used in combination with a linkage to move the lens. The follow focus apparatus may work through a set of gears that are attached to teeth on a focus ring of a camera lens so that as the follow focus apparatus is rotated, the camera lens is rotated and focused accordingly.

SUMMARY

The follow focus apparatus of this disclosure includes a gear ring and a sizing ring that are non-rotatably coupled together for use with a camera lens. The gear ring is manipulatable by a user and the sizing ring is non-rotatably couplable to the camera lens such that, when the follow focus apparatus is secured to, for example, a focus ring of the camera lens, rotation of the gear ring results in a corresponding rotation of the focus ring.

In aspects of the disclosure, a follow focus apparatus includes a gear ring and a sizing ring. The gear ring includes an outer surface, an inner surface, and at least one through-hole extending radially therethrough. The outer surface has a plurality of teeth extending radially outwardly therefrom, and the inner surface has a cavity defined therein. The sizing ring is releasably coupled to the gear ring and includes an outer ring body coaxially coupled to an inner ring body.

The outer ring body of the sizing ring may be releasably secured within the cavity of the gear ring. The sizing ring may be formed from a resilient material. Each of the outer and inner ring bodies of the sizing ring may have a front face and a rear face defining a length of the respective outer and inner ring bodies, and the length of the outer ring body may be less than the length of the inner ring body. The inner ring body may define an opening therethrough. The inner ring body of the sizing ring may include an outer surface coupled to the outer ring body and abutting the inner surface of the gear ring.

The gear ring may have a front face and a rear face extending between the outer and inner surfaces, and defining a length of the gear ring. The outer and inner surfaces of the gear ring may be annular, and the front and rear faces may be planar. Each tooth of the plurality of teeth may have an apex extending the length of the gear ring. The at least one through-hole of the gear ring may include a plurality of through-holes disposed in spaced relation relative to each other radially around the gear ring.

In a further embodiment, a gear ring and sizing ring assembly of a follow focus apparatus for use in focus adjustment of a camera lens, is provided. The gear ring and sizing ring assembly includes a non-deformable gear ring including a plurality of teeth extending radially outwardly from an outer surface thereof, an annular cavity defined in a radially inner surface thereof, the gear ring including at least one through-hole extending radially therethrough; a deformable sizing ring releasably coupled to the gear ring, the sizing ring including an outer sizing ring body coaxially coupled to an inner sizing ring body; and a securing member removably retained within the at least one through-hole and radially securing the ring gear and the sizing ring to one another.

The outer sizing ring body may be releasably secured within the cavity of the gear ring. The sizing ring may be formed from a resilient material. Each of the outer sizing and inner sizing ring bodies may have a front face and a rear face defining a length of the respective outer sizing and inner sizing ring bodies, the length of the outer sizing ring body being less than the length of the inner sizing ring body.

The inner sizing ring body may define an opening therethrough. The inner ring body of the sizing ring may include an outer surface coupled to the outer ring body and abutting the inner surface of the gear ring.

The gear ring may have a front face and a rear face extending between the outer and inner surfaces, and defining a length of the gear ring.

The outer and inner surfaces of the gear ring may be annular, and the front and rear faces may be planar.

Each tooth of the plurality of teeth may have an apex extending the length of the gear ring.

The at least one through-hole of the gear ring may include a plurality of through-holes disposed in spaced relation relative to each other radially around the gear ring; wherein the gear ring and sizing ring assembly may further include a securing member removably retained within each through-hole and radially securing the ring gear and the sizing ring to one another.

The details of one or more aspects of the disclosure are set forth in the accompanying drawings and the description below. Other features, objects, and advantages of the aspects described in this disclosure will be apparent from the description and drawings, and from the claims.

BRIEF DESCRIPTION OF THE DRAWINGS

Various aspects of this disclosure are described hereinbelow with reference to the drawings, which are incorporated in and constitute a part of this specification, wherein.

DETAILED DESCRIPTION

Figure 1C:
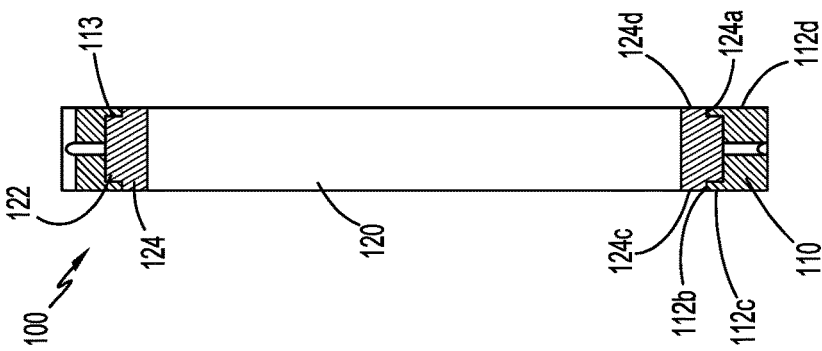
FIG. 1C is a cross-sectional view of the follow focus apparatus of FIG. 1A, taken along section line 1C-1C of FIG. 1B.

Aspects of this disclosure are now described in detail with reference to the drawings in which like reference numerals designate identical or corresponding elements in each of the several views. Throughout this description, the term "user" refers to the person using the device and/or the person configuring the device for use. The terms "generally," "substantially," and "about" shall be understood as words of approximation that take into account relatively little to no variation in the modified terms (e.g., differing by less than 10%). Directional reference terms, such as "front," "rear," and the like, are intended to ease description of the elements in this disclosure and are not intended to have any limiting effect on the ultimate orientation of a device or any parts thereof. In the following description, well-known functions or constructions are not described in detail to avoid obscuring the disclosure in unnecessary detail.

Figure 1B:
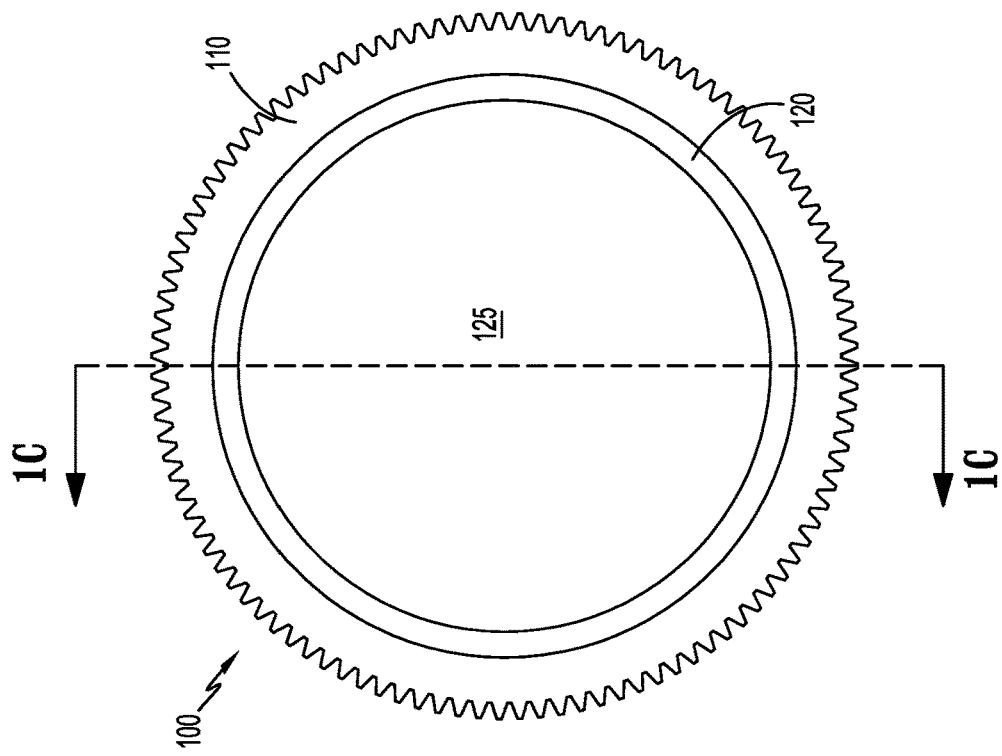
FIG. 1B is a front view of the follow focus apparatus of FIG. 1A.
Figure 1A:
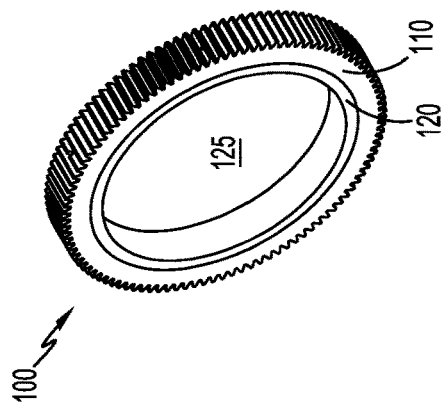
FIG. 1A is a perspective view of a follow focus apparatus in accordance with aspects of the disclosure.

Referring now to FIGS. 1A-1C, a follow focus apparatus 100 for adjusting the focus of a camera lens according to aspects of this disclosure is shown. The follow focus apparatus 100 includes a gear ring 110 and a sizing member or ring 120. The sizing ring 120 is releasably retained within the gear ring 110 and is coaxial therewith. The gear ring 110 may be manufactured using a variety of materials, such as, but not limited to, metals, plastics, polymers, resins, and combinations thereof, and the sizing ring 120 may be manufactured using a variety of resilient materials, such as, but not limited to, rubbers, plastics, resins, and combinations thereof.

Figure 2C:
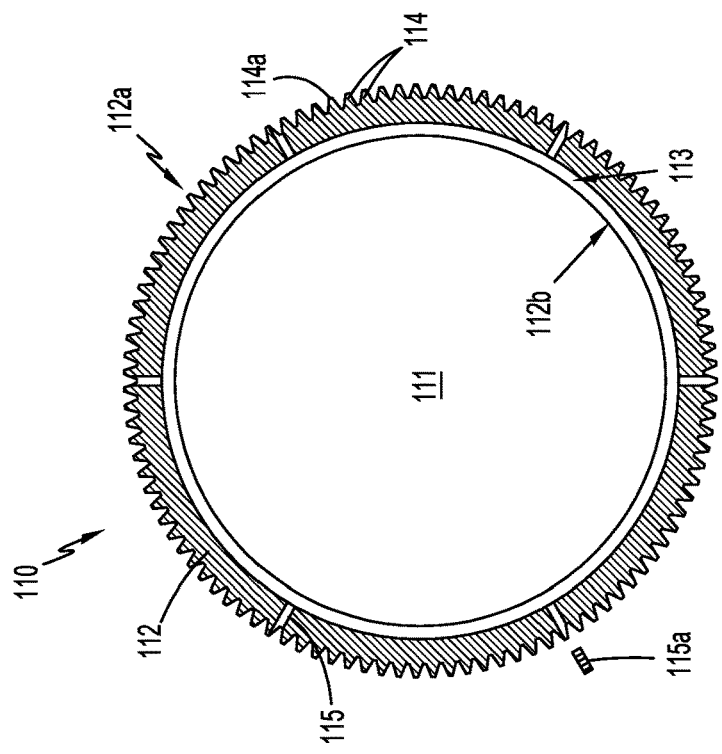
FIG. 2C is a cross-sectional view of the gear ring of FIG. 2A, taken along section line 2C-2C of FIG. 2A.
Figure 2B:
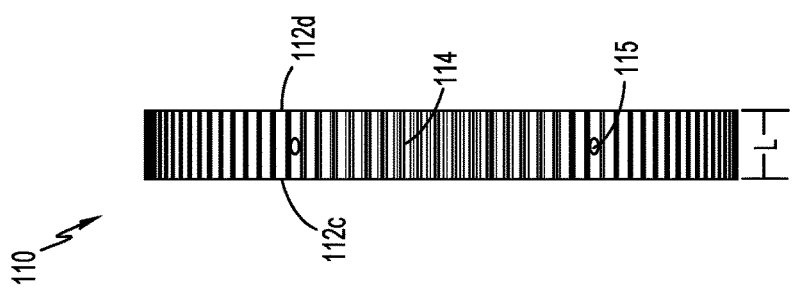
FIG. 2B is a side view of the gear ring of FIG. 2A.
Figure 2A:
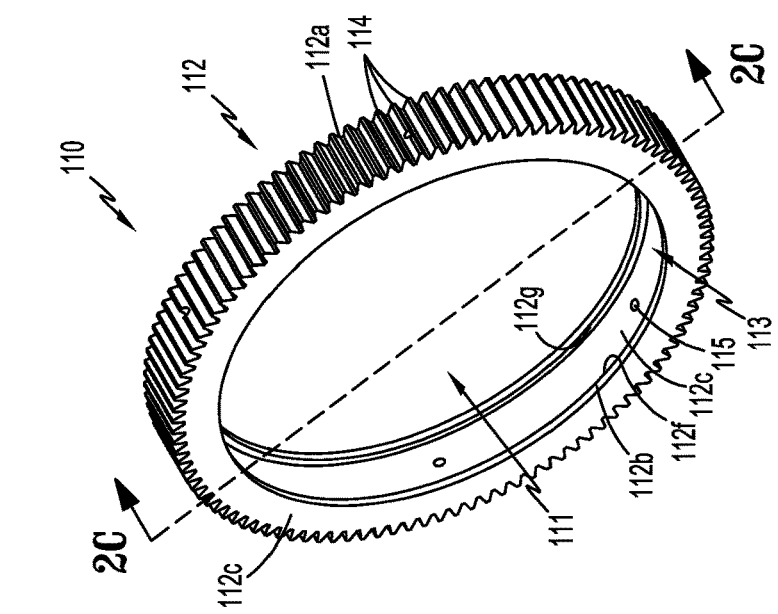
FIG. 2A is a perspective view of a gear ring of the follow focus apparatus of FIG. 1A.

As shown in FIGS. 2A-2C, the gear ring 110 includes a body 112 having a generally cylindrical or annular configuration including an outer surface 112a and an inner surface 112b. The inner surface 112b defines an open interior area or space 111 therein. The body 112 further includes a first or front face 112c and a second or rear face 112d that are substantially planar and extend between the outer and inner surfaces 112a, 112b. The front and rear faces 112c, 112d define a length "L" of the gear ring 110.

The outer surface 112a of the gear ring 110 has a plurality of teeth 114 defined therein. The teeth 114 extend radially outwardly from the body 112 and are spaced a predetermined distance apart from one another around the entirety of the outer surface 112a of the gear ring 110. Each of the teeth 114 has an apex 114a that extends the length "L" of the gear ring 110 from the front face 112c to the rear face 112d. The inner surface 112b of the gear ring 110 has a race cavity configuration including a channel or cavity 113 defined in and extending annularly around the inner surface 112b. The cavity 113 is depressed within the inner surface 112b and is defined by a recessed wall 112e and inner side walls 112f, 112g that are opposed to the front and rear faces 112c, 112d.

The gear ring 110 further includes cut-outs or through-holes 115 extending through the outer and inner surfaces 112a, 112b. Specifically, each through-hole 115 extends radially through the outer surface 112a and the recessed wall 112e of the cavity 113 of the inner surface 112b. The through-holes 115 are disposed in spaced relation (e.g., equally spaced) relative to each other around the gear ring 110, and in some aspects, are paired opposite one another. The through-holes 115 are configured to receive a securing member 115a therein. The securing members 115a may be, for example, screws, set-screws, pins, or the like, sized and shaped to extend into and through the gear ring 110 and to project into or against the sizing ring 120 (FIG. 1C) to fix the sizing ring 120 to the gear ring 110.

Figure 3C:
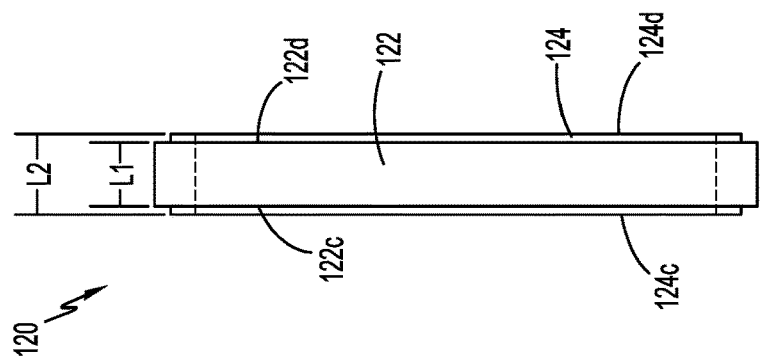
FIG. 3C is a side view of the sizing ring of FIG. 3A.
Figure 3B:
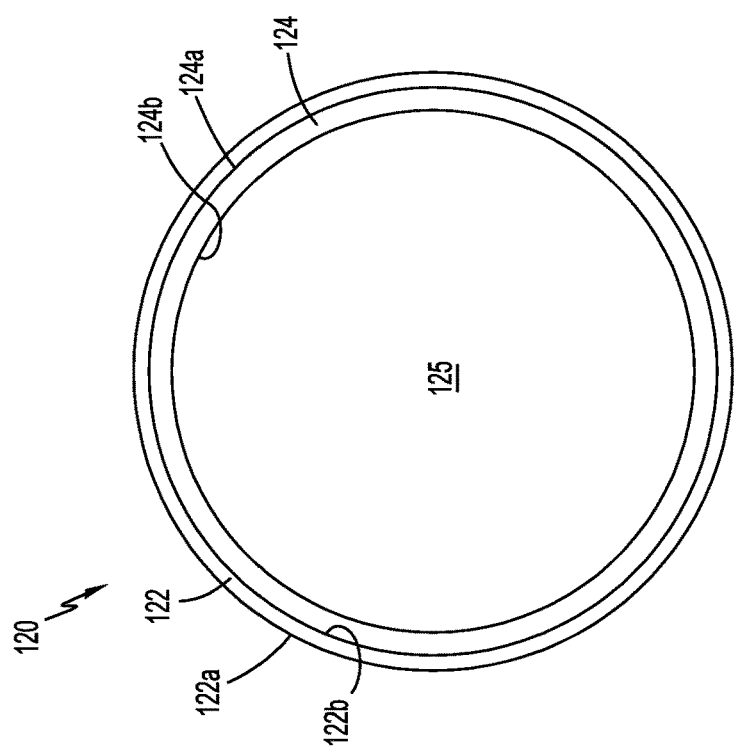
FIG. 3B is a front view of the sizing ring of FIG. 3A.
Figure 3A:
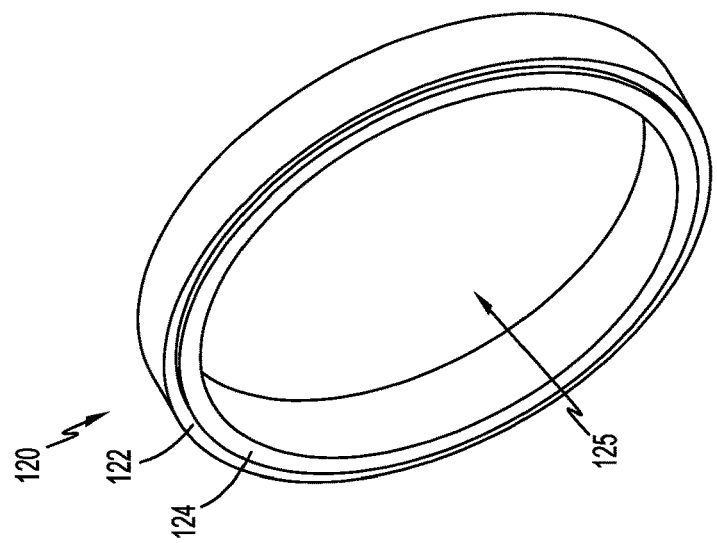
FIG. 3A is a perspective view of a sizing ring of the follow focus apparatus of FIG. 1A.

As shown in FIGS. 3A-3C, the sizing ring 120 includes an outer cylinder or ring body 122 and an inner cylinder or ring body 124. The outer ring body 122 includes an outer surface 122a and an inner surface 122b, which are substantially annular, and a front face 122c and a rear face 122d, which are substantially planar and extend between the outer and inner surfaces 122a, 122b. The inner ring body 124 includes an outer surface 124a and an inner surface 124b, which are substantially annular, and a front face 124c and a rear face 124d, which are substantially planar and extend between the outer and inner surfaces 124a, 124b. The inner surface 124b of the inner ring body 124 defines an opening or aperture 125 therethrough.

The front and rear faces 122c, 122d of the outer ring body 122 define a length "L1" of the outer ring body 122, and the front and rear faces 124c, 124d of the inner ring body 124 define a length "L2" of the inner ring body 124. The length "L1" of the outer ring body 122 is less than the length "L2" of the inner ring body 124. The outer and inner ring bodies 122, 124 are coaxially coupled (e.g., joined or integrally formed) together. Specifically, the outer and inner ring bodies 122, 124 are coupled at the inner surface 122b of the outer ring body 122 and the outer surface 124a of the inner ring body 124.

With reference again to FIGS. 1A-1C, the sizing ring 120 is configured to be received in the cavity 113 of the gear ring 110 and to extend radially inwardly of the gear ring 110 so as to decrease the size of the space 111 (FIG. 2A) defined within the gear ring 110 by a predetermined amount. Specifically, the outer ring body 122 of the sizing ring 120 is sized and shaped to fit within the cavity 113 of the gear ring 110 such that the outer surface 124a of the inner ring body 124, which extends transversely outwardly from the outer ring body 122, lies flush against the inner surface 112b of the gear ring 110, and the front and rear faces 124c, 124d of the inner ring body 124 are flush with the front and rear faces 112c, 112d of the gear ring 110. Assembled, the inner ring body 124 is positioned within the space 111 (FIG. 2) of the gear ring 110 and the opening 125 defined in the inner ring body 124 defines an interior dimension or diameter of the follow focus apparatus 100 that may be coupled to a rotating component of a camera.

Figure 4B:
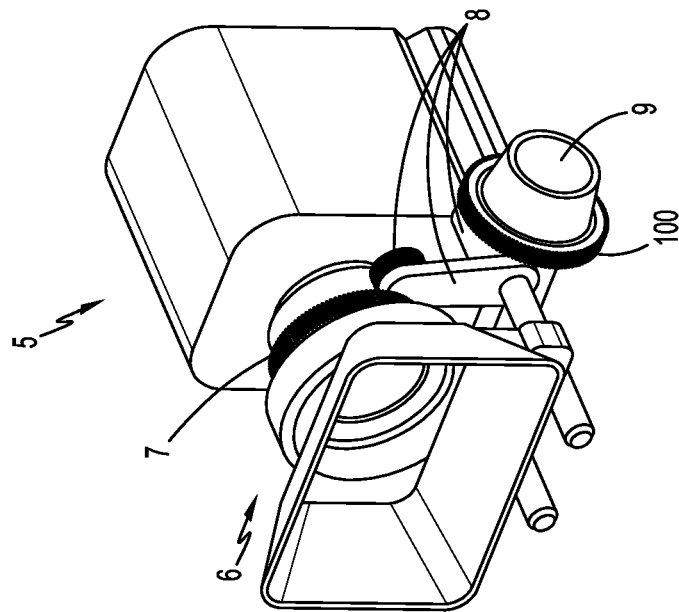
FIG. 4B is a perspective view of the follow focus apparatus of FIG. 1A, shown mounted a hand wheel that is coupled to a camera lens in accordance with another aspect of the disclosure.
Figure 4A:
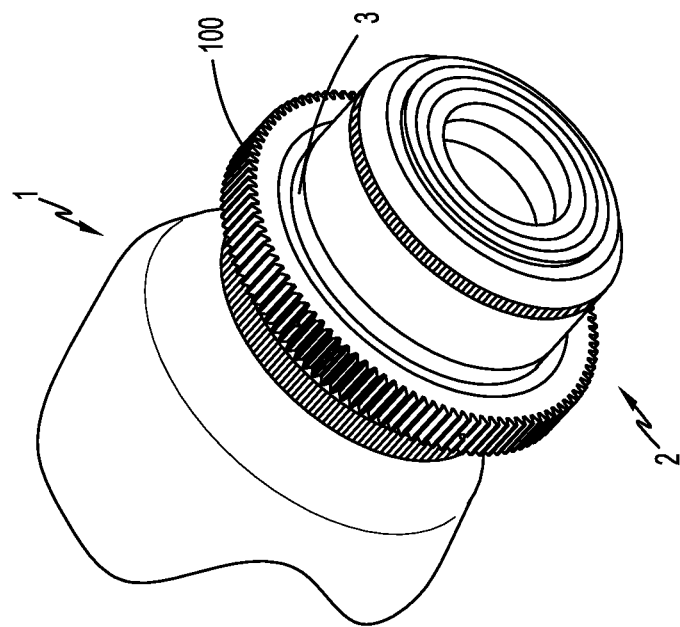
FIG. 4A is a perspective view of the follow focus apparatus of FIG. 1A, shown mounted on a camera lens in accordance with an aspect of the disclosure.

For example, as shown in FIG. 4A, the follow focus apparatus 100 may be mounted on a focus ring 3 of a camera lens 2 of a camera 1 (e.g., a film camera) to manually adjust the focus of the camera 1. As another example, shown in FIG. 4B, the follow focus apparatus 100 may be mounted on a hand wheel 9 of a linkage assembly 8 that is coupled to the focus ring 7 of a camera lens 6 of a camera 5 (e.g., a video camera). The resiliency of the material forming the sizing ring 120 enables the sizing ring 120 to be non-rotatably coupled to the gear ring 110 (e.g., frictionally fitted together) and non-rotatably coupled to a rotating component (e.g., a focus ring or a hand wheel) of a camera such that rotation of the gear ring 110 results in a corresponding rotation of the rotating component. Accordingly, the opening 125 defined in the inner ring body 124 of the follow focus apparatus 100 corresponds in size to the rotating component.

In some aspects, a follow focus apparatus may be provided in a kit including a gear ring and one or more sizing rings having inner ring bodies of different heights and thus, different sized openings, for accommodating different sized and/or shaped rotating camera components (e.g., camera lenses). The sizing rings may be interchanged depending upon the desired size of the opening. The kit may further include a plurality of securing members for securing the gear and sizing rings together.

It should be understood that while the follow focus apparatus 100 has been described for use with a focus ring of a camera, the follow focus apparatus 100 may be configured to engage or be coupled to a focus, zoom, aperture, or other adjustment ring on a camera.

While aspects of the disclosure have been shown in the drawings, it is not intended that the disclosure be limited thereto, as it is intended that the disclosure be as broad in scope as the art will allow and that the specification be read likewise. It is to be understood, therefore, that the disclosure is not limited to the precise aspects described, and that various other changes and modifications may be effected by one skilled in the art without departing from the scope or spirit of the disclosure. Therefore, the above description should not be construed as limiting, but merely as exemplifications of aspects of the disclosure and the subject matter of the present disclosure is not limited by what has been particularly shown and described. Thus, the scope of the disclosure should be determined by the appended claims and their legal equivalents, rather than by the examples given.

What is claimed is:

1. A follow focus apparatus for focus adjustment of a camera lens, the follow focus apparatus comprising:
   a gear ring including an outer surface and an inner surface, the outer surface having a plurality of teeth extending radially outwardly therefrom and the inner surface having a cavity defined therein, wherein the cavity is in the form of a radial channel having a recessed wall, a front wall and a real wall; and
   a sizing ring releasably coupled to the gear ring, the sizing ring including an inner ring body dimensioned to extend over the front wall and the rear wall defining the cavity, and an outer ring body coaxially coupled to the inner ring body, the outer ring body dimensioned to be seated between the front wall and the rear wall defining the cavity, wherein:
      the outer ring body defines a first length, wherein the first length of the outer ring body is sized to be received between the front wall and the rear wall of the gear ring; and
      the inner ring body defines a second length greater than the first length, wherein the inner ring body extends substantially equally from a first side of the sizing ring and from a second side of the sizing ring.

2. The follow focus apparatus according to claim 1, wherein the outer ring body of the sizing ring is located substantially equally between the first side of the sizing ring and the second side of the sizing ring.

3. The follow focus apparatus according to claim 1, wherein the sizing ring is formed from a resilient material.

4. The follow focus apparatus according to claim 1, wherein each of the outer and inner ring bodies of the sizing ring has a front face and a rear face defining a length of the respective outer and inner ring bodies, the length of the outer ring body being less than the length of the inner ring body.

5. The follow focus apparatus according to claim 1, wherein the inner ring body defines an opening therethrough.

6. The follow focus apparatus according to claim 2, wherein the inner ring body of the sizing ring includes an outer surface coupled to the outer ring body and abutting the inner surface of the gear ring.

7. The follow focus apparatus according to claim 1, wherein the gear ring has a front face and a rear face extending between the outer and inner surfaces, and defining a length of the gear ring, wherein the front wall defining the cavity extends radially inward from the front face of the ring gear, and wherein the rear wall defining the cavity extends radially inward from the rear face of the ring gear.

8. The follow focus apparatus according to claim 7, wherein the outer and inner surfaces of the gear ring are annular, and the front and rear faces are planar.

9. The follow focus apparatus according to claim 7, wherein the first length of the outer ring body extends more than one half the second length of the inner ring body.

10. The follow focus apparatus according to claim 1, wherein the gear ring includes at least one through-hole extending radially therethrough and through the recessed wall of the cavity, wherein the at least one through-hole of the gear ring includes a plurality of through-holes disposed in spaced relation relative to each other radially around the gear ring, wherein each of the plurality of through-holes is located mid-way between the front wall and the rear wall of the gear ring; and
    wherein the follow focus apparatus further includes a securing member removably retained within each at least one through-hole and radially extending into the sizing ring for securing the ring gear and the sizing ring to one another.

11. A gear ring and sizing ring assembly of a follow focus apparatus for use in focus adjustment of a camera lens, the gear ring and sizing ring assembly comprising:
    a non-deformable gear ring including a plurality of teeth extending radially outwardly from an outer surface thereof, an annular cavity defined in a radially inner surface thereof, wherein the cavity is in the form of a radial channel having a recessed wall, a front wall and a real wall, the gear ring including at least one through-hole extending radially therethrough and through the recessed wall of the cavity;
    a deformable sizing ring releasably coupled to the gear ring, the sizing ring including an inner ring body dimensioned to extend over the front wall and the rear wall defining the cavity, and an outer sizing ring body coaxially coupled to the inner sizing ring body, the outer ring body dimensioned to be seated between the front wall and the rear wall defining the cavity, wherein:
       the outer sizing ring body defines a first length, wherein the first length of the outer sizing ring body is sized to be received between the front wall and the rear wall of the gear ring; and
       the inner ring body defines a second length greater than the first length, wherein the inner ring body extends substantially equally from a first side of the sizing ring and from a second side of the sizing ring; and
    a securing member removably retained within the at least one through-hole and radially extending into the sizing ring for securing the ring gear and the sizing ring to one another.

12. The gear ring and sizing ring assembly according to claim 11, wherein the outer sizing ring body is located substantially equally between the first side of the sizing ring and the second side of the sizing ring.

13. The gear ring and sizing ring assembly according to claim 11, wherein the sizing ring is formed from a resilient material.

14. The gear ring and sizing ring assembly according to claim 11, wherein each of the outer sizing and inner sizing ring bodies has a front face and a rear face defining a length of the respective outer sizing and inner sizing ring bodies, the length of the outer sizing ring body being less than the length of the inner sizing ring body.

15. The gear ring and sizing ring assembly according to claim 11, wherein the inner sizing ring body defines an opening therethrough.

16. The gear ring and sizing ring assembly according to claim 12, wherein the inner ring body of the sizing ring includes an outer surface coupled to the outer ring body and abutting the inner surface of the gear ring.

17. The gear ring and sizing ring assembly according to claim 11, wherein the gear ring has a front face and a rear face extending between the outer and inner surfaces, and defining a length of the gear ring, wherein the front wall defining the cavity extends radially inward from the front face of the ring gear, and wherein the rear wall defining the cavity extends radially inward from the rear face of the ring gear.

18. The gear ring and sizing ring assembly according to claim 17, wherein the outer and inner surfaces of the gear ring are annular, and the front and rear faces are planar.

19. The gear ring and sizing ring assembly according to claim 17, wherein the first length of the outer sizing ring body extends more than one half the second length of the inner ring body.

20. The gear ring and sizing ring assembly apparatus according to claim 11, wherein the at least one through-hole of the gear ring includes a plurality of through-holes disposed in spaced relation relative to each other radially around the gear ring, wherein each of the plurality of through-holes is located mid-way between the front wall and the rear wall of the gear ring; and further comprising a securing member removably retained within each through-hole and radially securing the ring gear and the sizing ring to one another.

* * * * *